(12) United States Patent
Simmonds et al.

(10) Patent No.: US 12,152,700 B2
(45) Date of Patent: Nov. 26, 2024

(54) PILOT VALVE HAVING DIAPHRAGM

(71) Applicant: MAC Valves, Inc., Wixom, MI (US)

(72) Inventors: Jeffrey Simmonds, Commerce Township, MI (US); Brett Landacre, Bloomfield Hills, MI (US)

(73) Assignee: MAC Valves, Inc., Wixom, MI (US)

( * ) Notice: Subject to any disclaimer, the term of this patent is extended or adjusted under 35 U.S.C. 154(b) by 0 days.

(21) Appl. No.: 17/946,607

(22) Filed: Sep. 16, 2022

(65) Prior Publication Data

US 2024/0093790 A1    Mar. 21, 2024

(51) Int. Cl.
*F16K 7/12*    (2006.01)
*F16K 11/07*    (2006.01)
*F16K 27/04*    (2006.01)
*F16K 31/06*    (2006.01)
*F16K 41/12*    (2006.01)

(52) U.S. Cl.
CPC ............ *F16K 7/12* (2013.01); *F16K 11/0712* (2013.01); *F16K 27/041* (2013.01); *F16K 31/0603* (2013.01); *F16K 31/0613* (2013.01); *F16K 41/12* (2013.01)

(58) Field of Classification Search
CPC .... F16K 7/12; F16K 31/0603; F16K 31/0613; F16K 31/0617; F16K 31/061; F16K 41/12; F16K 11/0655; F16K 11/07; F16K 11/0712; F16K 27/041; F16K 27/044
See application file for complete search history.

(56) References Cited

U.S. PATENT DOCUMENTS

| | | | | |
|---|---|---|---|---|
| 2,934,090 A * | 4/1960 | Kenann | ................. | F16K 11/044 137/625.5 |
| 5,211,198 A * | 5/1993 | Tinholt | ............... | F16K 31/0627 137/625.5 |
| 5,345,857 A * | 9/1994 | Murphy | ................... | F16J 3/041 264/572 |
| 5,535,783 A * | 7/1996 | Asou | ................... | F16K 31/0693 137/625.65 |
| 6,116,276 A * | 9/2000 | Grill | ................... | F16K 31/0627 137/596.17 |
| 6,129,115 A * | 10/2000 | Janssen | ............... | F15B 13/0405 137/625.65 |
| 6,305,664 B1 * | 10/2001 | Holmes | ............... | F16K 31/0665 251/129.18 |
| 6,481,689 B2 * | 11/2002 | Grill | ................... | F15B 13/0405 251/129.17 |
| 6,488,050 B1 * | 12/2002 | Jabcon | ................... | F16K 11/044 137/625.65 |

(Continued)

*Primary Examiner* — Craig M Schneider
*Assistant Examiner* — Andrew J Rost
(74) *Attorney, Agent, or Firm* — Harness, Dickey & Pierce, P.L.C.

(57) ABSTRACT

A valve apparatus that includes a valve assembly including valve body that defines an inlet, a first outlet, and a second outlet, and including a poppet located in the valve body that includes a valve member. An actuator assembly is attached to the valve assembly that includes an armature that is coupled to the poppet and is configured to move the poppet and the valve member to control a flow of fluid through the valve assembly from the inlet to either the first outlet or the second outlet. A diaphragm is located between valve assembly and the actuator assembly that is configured to seal the valve assembly from the actuator assembly.

19 Claims, 7 Drawing Sheets

(56) References Cited

U.S. PATENT DOCUMENTS

| | | | | |
|---|---|---|---|---|
| 7,523,763 B2* | 4/2009 | Katsuta | ............... | F16K 31/0627 |
| | | | | 251/282 |
| 9,010,373 B2* | 4/2015 | Neff | .................. | F15B 13/044 |
| | | | | 251/282 |
| 9,022,069 B2* | 5/2015 | Neff | .................. | F16K 39/022 |
| | | | | 251/282 |
| 9,103,463 B2* | 8/2015 | Williams | ............ | F16K 31/0658 |
| 2007/0023722 A1* | 2/2007 | Oishi | ................. | F16K 31/0613 |
| | | | | 137/625.69 |
| 2008/0251748 A1* | 10/2008 | Neff | .................. | F16K 31/0627 |
| | | | | 251/129.15 |
| 2019/0264823 A1* | 8/2019 | Itoh | .................... | F16K 31/0634 |
| 2020/0063886 A1* | 2/2020 | Schneider | ............ | F16K 31/0693 |
| 2020/0088309 A1* | 3/2020 | Kono | .................... | F16F 1/047 |
| 2021/0071766 A1* | 3/2021 | Yajima | .................. | F16K 11/07 |
| 2021/0131580 A1* | 5/2021 | Ogasawara | ........... | F16K 27/041 |

* cited by examiner

PILOT VALVE HAVING DIAPHRAGM

FIELD

The present disclosure relates to a pilot valve having a diaphragm.

BACKGROUND

This section provides background information related to the present disclosure which is not necessarily prior art.

Solenoid operated valves, such as poppet valves, can be used to control the flow of a fluid, such as pressurized air, through a manifold. Such manifolds may be part of equipment such as sorters, packaging machines, food processors, and the like that are driven by the pressurized fluid. While the fluid may be pressurized air, there is a possibility that condensation may develop in the manifold. If the condensation reaches the solenoid, operation of the solenoid may be affected. Thus, there is a need to prevent condensation or moisture from reaching the solenoid to ensure optimal operation of the solenoid operated valve.

SUMMARY

This section provides a general summary of the disclosure and is not a comprehensive disclosure of its full scope or all of its features.

According to a first aspect of the present disclosure, there is provided a valve apparatus that comprises a valve assembly (12) including a valve body (20) defining an axially extending bore (32) having an inlet (22) and at least one outlet (28) in communication therewith, a valve seat (108) positioned within the axially extending bore (32), and a poppet (14) extending through the axially extending bore (32) and having a valve member (54) configured to contact the valve seat (108) to control a flow of fluid from the inlet (22) to the at least one outlet (28); a solenoid assembly (18) attached to the valve assembly (12) that is configured to move the valve member (54) towards and away from the valve seat (108); and a diaphragm (162) positioned in the axially extending bore (32) between the valve assembly (12) and the solenoid assembly (18), the diaphragm (162) being configured to seal the valve assembly (12) from the solenoid assembly (18).

According to the first aspect, the diaphragm (162) is an annular member including an annular nub (170) extending about a perimeter of the annular member, the annular nub (170) being configured to mate with an annular groove (172) formed in the valve body (20).

According to the first aspect, the at least one outlet (28) is positioned on a first side of the valve member (54) and another outlet (24) is located on a second and opposite side of the valve member (54), and when solenoid assembly (18) moves the valve member (54) away from the valve seat (108), the fluid is permitted to flow to the another outlet (24).

According to the first aspect, the valve seat (108) extends radially inwardly from the axially extending bore (32), and an adjustable valve seat (106) positioned in the axially extending bore (32) is configured to be contacted by the valve member (54) when the valve member (54) is moved by the solenoid assembly (18) away from the valve seat (108) to thereby prevent the fluid from flowing from the inlet (22) to the at least one outlet (28), and permit the fluid to flow from the inlet (22) to the another outlet (24).

According to the first aspect, the valve assembly (12) includes a spring (68) that biases the valve member (54) of the poppet (14) into engagement with the valve seat (108).

According to a second aspect of the present disclosure, there is provided a valve apparatus that comprises a valve body (20) defining an inlet (22), a first outlet (28), and a second outlet (24) that each communicate with an axially extending bore (32); a valve assembly (12) including a poppet (14) having a valve member (54) located within the axially extending bore (32), the poppet (14) being movable relative to a valve seat (108) and an adjustable valve seat (106) that are each configured to be contacted by the valve member (54), wherein contact between the valve member (54) and the valve seat (108) permits a fluid to flow from the inlet (22) to the first outlet (28); a solenoid assembly (18) attached to the valve body (20), the solenoid assembly (18) including a solenoid coil (116) and a pole piece (122) that is connected to the poppet (14) and at least partially extends into the axially extending bore (32), the solenoid coil (116) and the pole piece (122) configured to cooperatively move the valve member (54) away from the valve seat (108) toward the adjustable valve seat (106) to permit the fluid to flow from the inlet (22) to the second outlet (24); and a diaphragm (162) positioned in the axially extending bore (32) between the pole piece (122) and the poppet (14), the diaphragm (162) being configured to seal the valve body (20) from the solenoid assembly (18).

According to the second aspect, the valve seat (108) extends radially inwardly from the axially extending bore (32).

According to the second aspect, the diaphragm (162) is an annular member including an annular nub (170) extending about a perimeter of the annular member, the annular nub (170) being configured to mate with an annular groove (172) formed in the valve body (20).

According to the second aspect, the valve apparatus further comprises a first spring (142) that biases the pole piece (122) in a direction toward the poppet (14) to bias the valve member (54) of the poppet (14) into engagement with the adjustable valve seat (106) upon application of a voltage to the solenoid assembly (18).

According to the second aspect, the valve retainer (42) includes a second spring (65) that biases the poppet (14) in a direction toward the pole piece (122).

According to a third aspect of the present disclosure, there is provided a valve apparatus that comprises a valve assembly (12) including valve body (20) that defines an inlet (22), a first outlet (28), and a second outlet (24), and including a poppet (14) located in the valve body (20) that includes a valve member (54); an actuator assembly (16) attached to the valve assembly (12), the actuator assembly (16) including an armature (118) that is coupled to the poppet (14) and is configured to move the poppet (14) and the valve member (54) to control a flow of fluid through the valve assembly (12) from the inlet (22) to either the first outlet (28) or the second outlet (24); and a diaphragm (162) located between valve assembly (12) and the actuator assembly (16), the diaphragm (162) being configured to seal the valve assembly (12) from the actuator assembly (16).

According to the third aspect, the diaphragm (162) is an annular member including an annular nub (170) extending about a perimeter of the annular member, the annular nub (170) being configured to mate with an annular groove (172) formed in the valve body (20).

According to the third aspect, the actuator assembly (16) includes a solenoid assembly (18) that includes the armature (118), the armature (118) moving the poppet (14) and the valve member (54) upon application of a voltage to the solenoid assembly (18).

According to the third aspect, wherein the solenoid assembly (18) includes a pole piece (122) positioned between the armature (118) and the poppet (14) that cooperates with the armature (118) to move the poppet (14).

According to the third aspect, the poppet (14) is positioned in an axially extending bore defining a first valve seat (108) that is configured to be engaged by the valve member (54).

According to the third aspect, the valve apparatus further comprises a first spring (142) that biases the pole piece (122) in a direction toward the poppet (14) to bias the valve member (54) of the poppet (14) into engagement with a second valve seat (106) upon application of the voltage to the solenoid assembly.

According to the third aspect, when no voltage is applied to the solenoid assembly (18) the valve member (54) is engaged with the first valve seat (108).

According to the third aspect, the poppet (14) is positioned in an adjustable valve retainer (44) having a second spring (68) that biases the poppet (14) in a direction toward the actuator assembly (16).

According to the third aspect, a spring constant of the first spring (142) is less than a spring constant of the second spring (68).

According to the third aspect, the valve body (20) includes a first exhaust downstream (30) from the first outlet (28), and a second exhaust (26) located downstream from the second outlet (24).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings, and are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

FIGS. 1-5 illustrates a valve apparatus 10 according to a principle of the present disclosure. Valve apparatus 10 includes a valve assembly 12 that houses a movable poppet 14 (FIGS. 3-5), and an actuator assembly 16 that is configured to actuate the movable poppet 14. In the illustrated embodiment, actuator assembly 16 houses a solenoid assembly 18 that upon application of a voltage thereto is configured to move the poppet 14 back and forth within the valve assembly 12. Use of solenoid assembly 18 is beneficial from the standpoint that movement of the poppet 14 can be more strictly controlled, which increases the ability of valve apparatus 10 to more strictly control an amount of fluid that is permitted to pass through valve apparatus 10.

Figure 1:
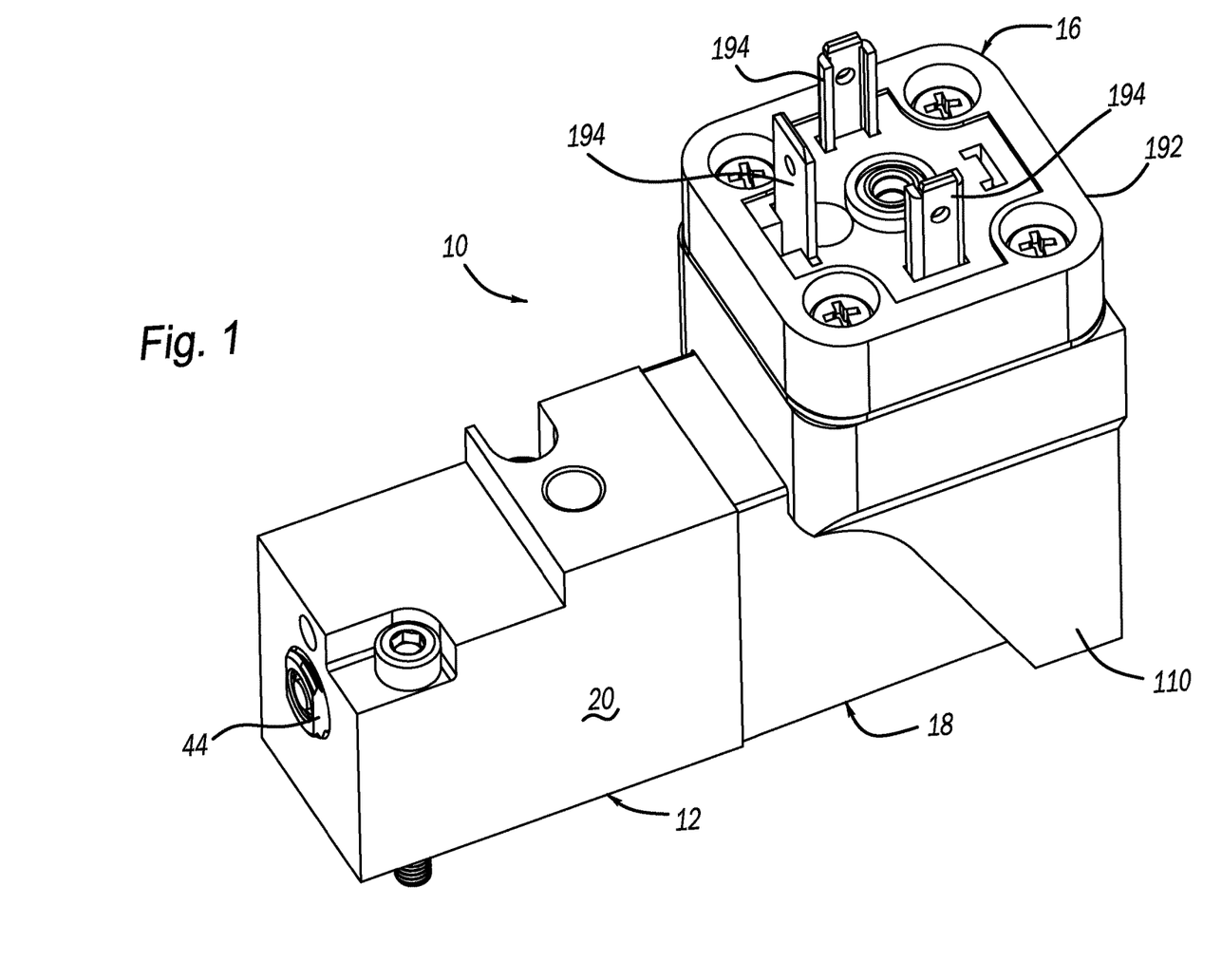
FIGS. 1 to 3 are various perspective views of a valve apparatus according to a principle of the present disclosure.
Figure 2:
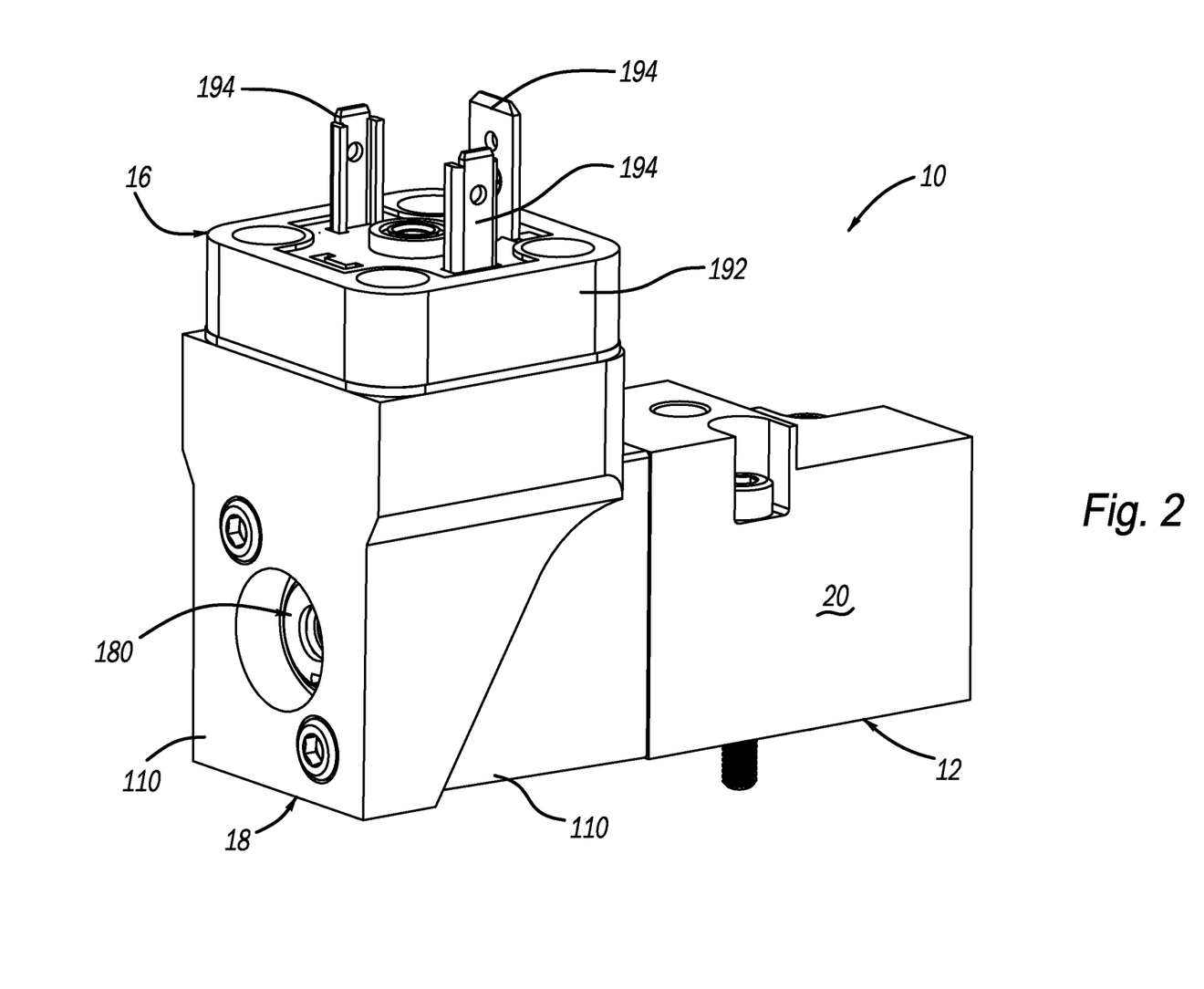
Figure 3:
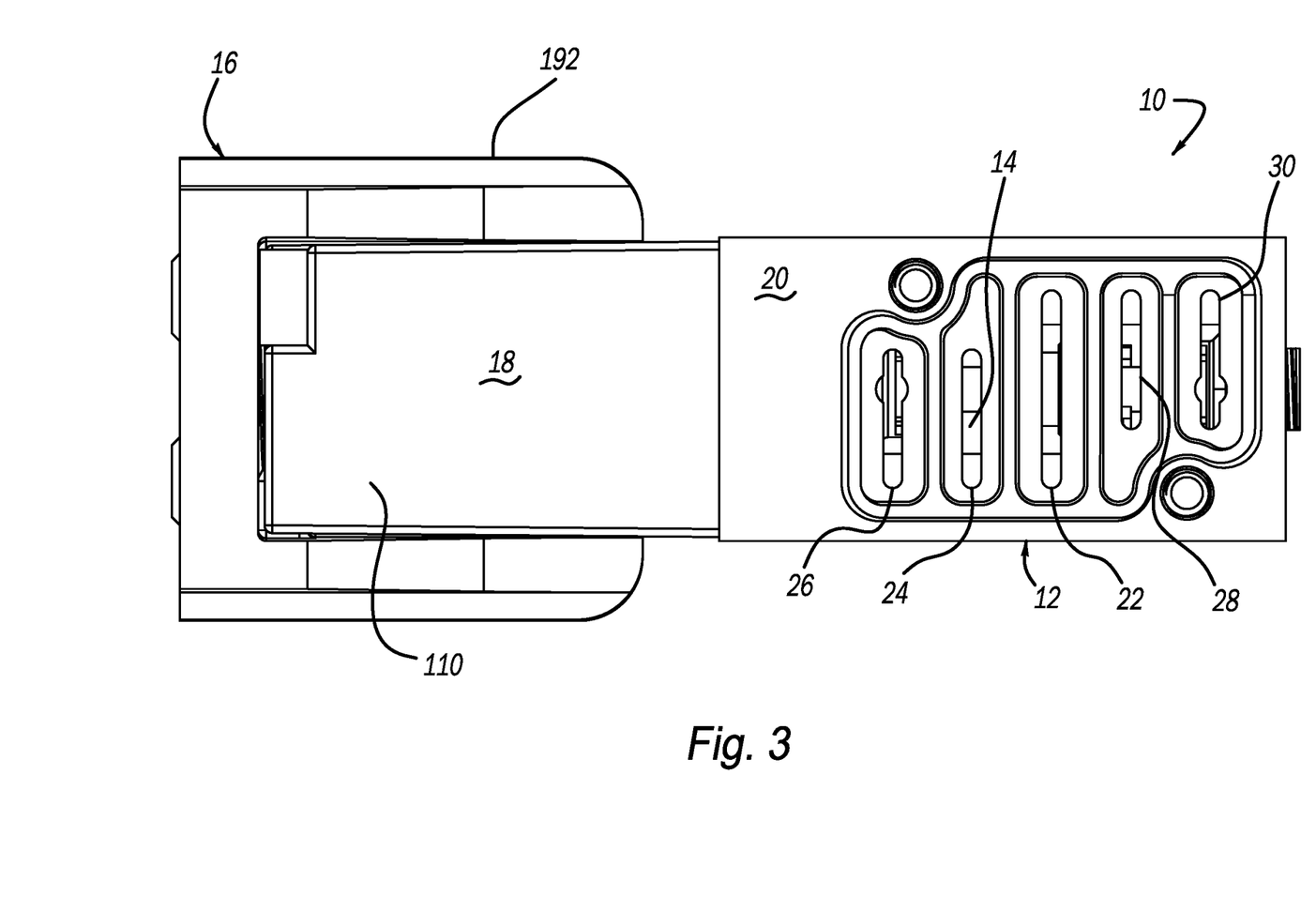
Figure 5:
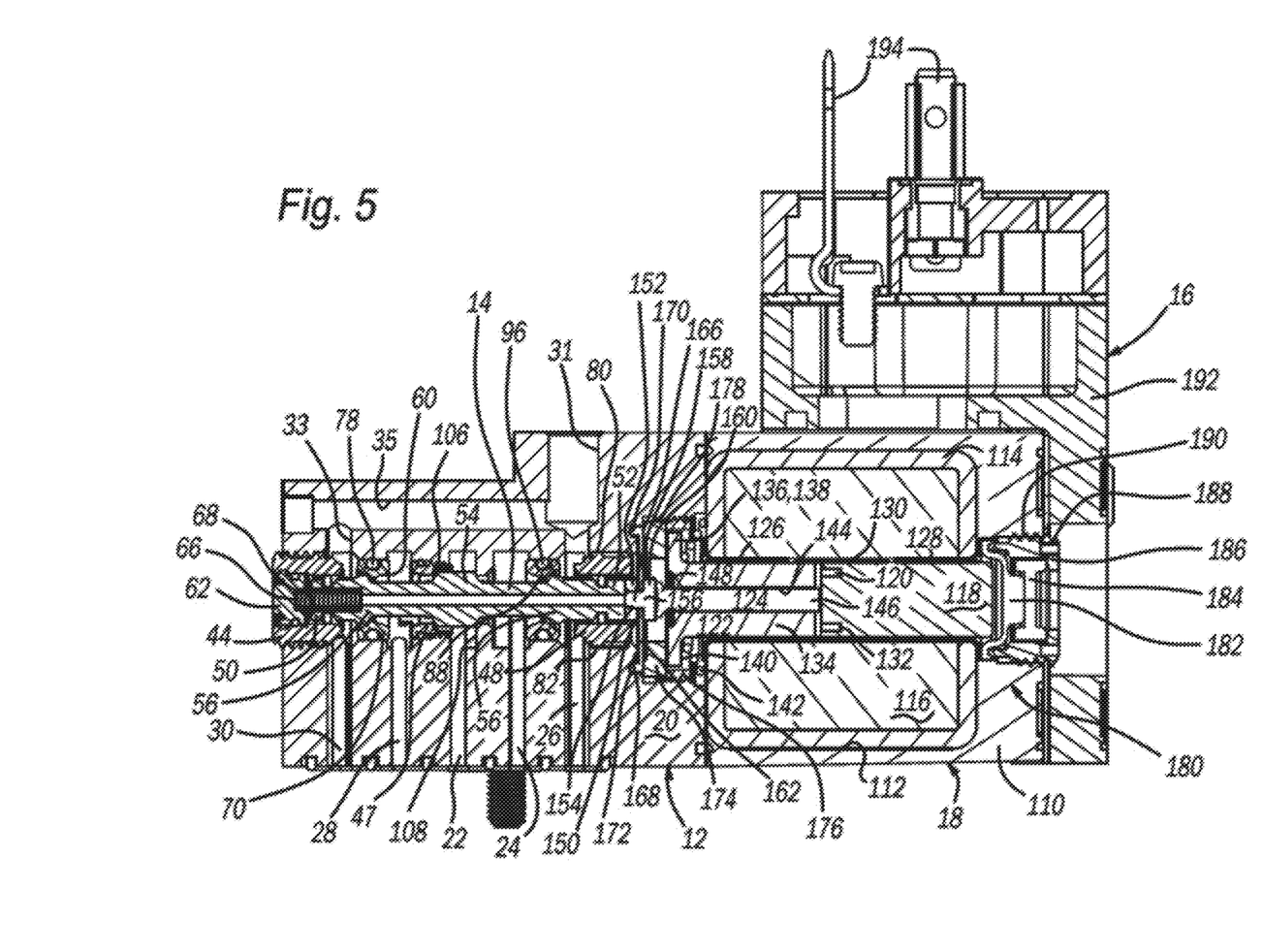
FIG. 5 is a cross-sectional view of the valve apparatus illustrated in FIGS. 1-3.
Figure 6:
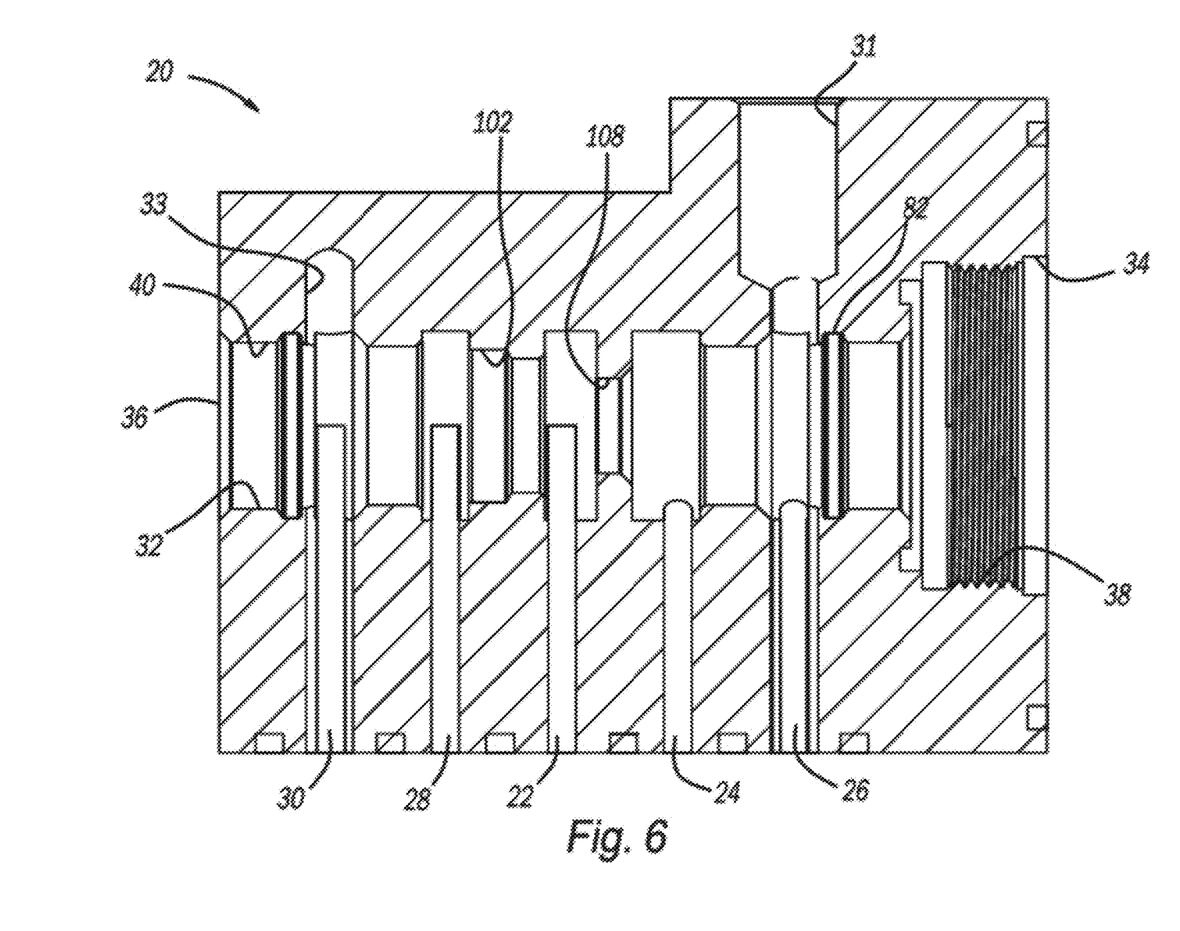
FIG. 6 is a cross-sectional view of a valve body or manifold of a valve assembly of the valve apparatus.

Valve assembly 12 is a pilot valve assembly that includes a manifold or pilot body 20 may be formed of a rigid material such as a metal material. Example metal materials include brass, steel, aluminum, or any other type of metal material or alloy known to one skilled in the art. While rigid materials such as metal are preferred, it should be understood that pilot body 20 may be formed of a rigid polymeric material if desired. As best shown in FIGS. 3, 5, and 6, pilot body 20 includes an inlet 22, a first outlet 28, a first exhaust 30, a second outlet 24, a second exhaust 26, a third exhaust 33, and a fourth exhaust 31. Each of inlet 22, first outlet 28, first exhaust 30, second outlet 24, second exhaust 26, third exhaust 33, and fourth exhaust 31 are in communication with an axially extending bore 32 that, as best shown in FIG. 6, passes through an entirety of pilot body 20. Inlet 22, first outlet 28, first exhaust 30, second outlet 24, second exhaust 26, third exhaust 33, and fourth exhaust 31 each extend radially outward from bore 32, with third and fourth exhaust 33, 31 being connected by an axially extending passage 35 (FIG. 5).

Referring to FIG. 6, bore 32 includes a first open end 34 and an opposite second open end 36, with first open end 34 being located proximate actuator assembly 16 and second open end 36 being located distal from actuator assembly 16. First open end 34 is threaded at 38 and configured for receipt of a portion of a solenoid assembly 18 (FIG. 5). Second open end 36 is threaded at 40 and is configured for receipt of a poppet assembly 42 including a first adjustable valve retainer 44 having an exterior threaded surface 46 (see FIGS. 7 and 8) that is configured to threadingly engage with second open end 36 at 40.

Figure 7:
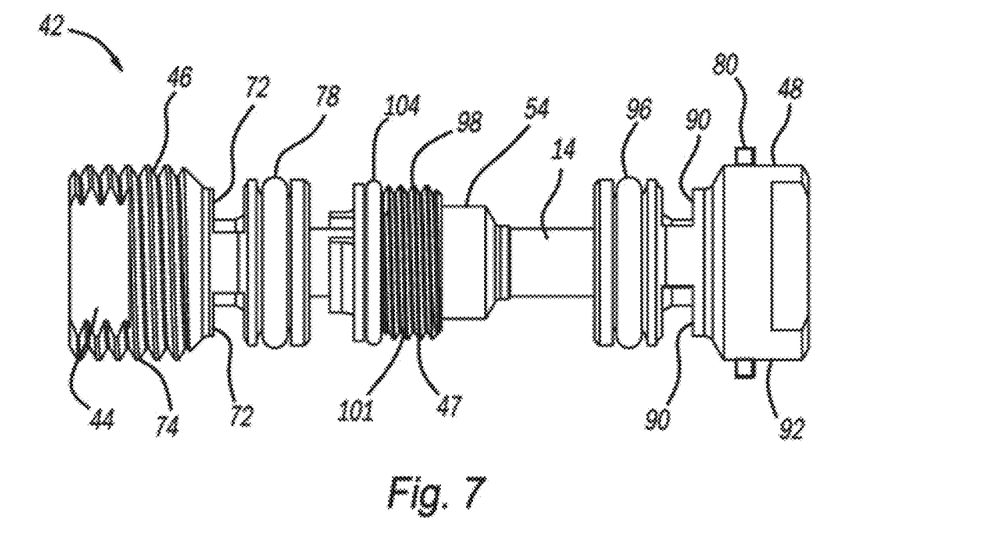
FIG. 7 is a perspective view of a poppet assembly of the valve apparatus illustrated in FIGS. 1-3.
Figure 8:
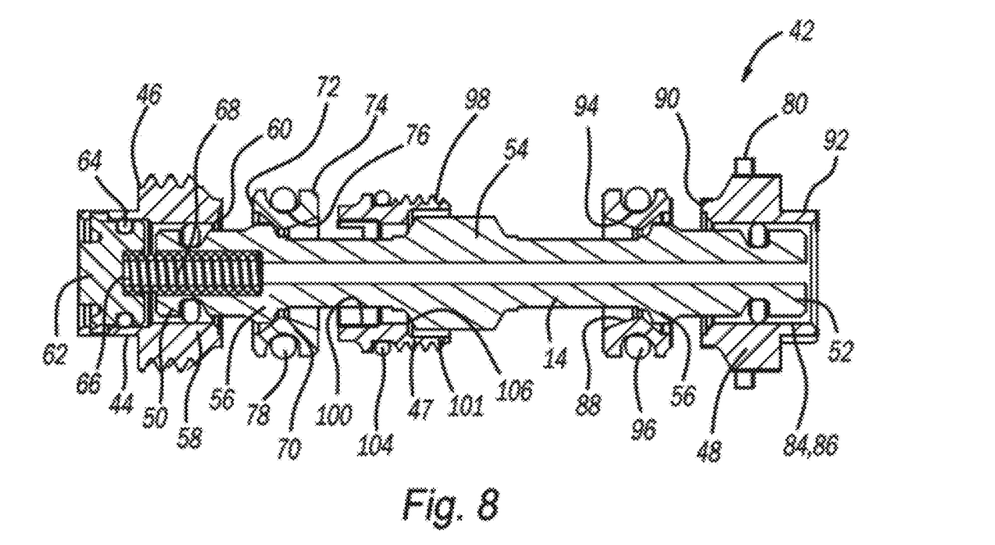
FIG. 8 is a cross-sectional view of the poppet assembly illustrated in FIG. 7.

Poppet assembly 42 is configured to be seated within bore 32 of pilot body 20. As best shown in FIGS. 5, 7, and 8, poppet assembly 42 includes poppet 14, a first adjustable valve retainer 44, an adjustable valve seat 47, and a second adjustable valve retainer 48. Poppet 14 includes a first end 50 located within first adjustable valve retainer 44, an opposite second end 52 located within second adjustable valve retainer 48, and a valve member 54 located between the first and second ends 50, 52 that cooperates with adjustable valve seat 47 to control whether fluid received from inlet 22 will exit the valve apparatus 10 through either first outlet 28 or second outlet 24. Further, first end 50 and second end 52 of poppet 14 each define exhaust valve members 56 that cooperate with first adjustable valve retainer 44 and second adjustable valve retainer 48 to control whether fluid is permitted to exit valve apparatus 10 through either first exhaust 30 and third exhaust 33 or second exhaust 26 and fourth exhaust 31. Poppet 14 may be formed of a rigid material such as a metal material, or may be formed of a rigid polymeric material.

Still referring to FIGS. 5, 7, and 8, first adjustable valve retainer 44 is a generally cylindrically-shaped member that includes threading 46 for mating with threaded second open end 36 of pilot body 20 at 40, which enables the location of first adjustable valve retainer 44 to be adjusted relative to pilot body 20. That is, the location of first adjustable valve retainer 44 can be changed (i.e., moved further or lesser into bore 32) by controlling the amount of threaded engagement between threading 46 and threaded second open end 36.

As best shown in FIG. 8, first adjustable valve retainer 44 includes a passage 58 having a surface 60. Passage 58 is configured for receipt of poppet 14, as well as a plug 62 that seals the passage 58 and prevents fluid from escaping valve apparatus 10 through passage 58. In this regard, plug 62 includes a seal member 64 mounted thereto for sealing engagement with surface 60. In addition, plug 62 includes a recess configured as a spring seat 66 for a spring 68 that is positioned between plug 62 and poppet 14 that is configured to bias poppet 14 toward solenoid assembly 18.

Still referring to FIG. 8, surface 60 defines a first valve seat 70 that cooperates with exhaust valve member 56 of first end 50 of poppet 14 to control whether fluid is permitted to exit valve apparatus 10 through first exhaust 30 and third exhaust 33. First adjustable valve retainer 44 includes outlet ports 72 that, when exhaust valve member 56 of first end 50 is moved away from first valve seat 70, permit fluid to exit valve apparatus 10 through first exhaust 30 and third exhaust 33. First adjustable valve retainer 44 also includes an exterior surface 74 that includes threaded end 46 and also includes a recess 76 that is configured for receipt of a seal member 78 that engaged with bore 32 of pilot body 20.

Second adjustable valve retainer 48 is similar to first adjustable valve retainer 44. Thus, when second adjustable valve retainer 48 is located within bore 32, the location of second adjustable valve retainer 48 can be adjusted. In this regard, second adjustable valve retainer 48 is a generally cylindrically-shaped member that includes a threaded surface 80 that mates with a similarly-threaded surface 82 formed in bore 32. Second adjustable valve retainer 48 includes a passage 84 that is configured for receipt of second end 52 of poppet 14.

Passage 84 includes a surface 86 defines a second valve seat 88 that cooperates with exhaust valve member 56 of second end 52 of poppet 14 to control whether fluid is permitted to exit valve apparatus 10 through second exhaust 26 and fourth exhaust 31. Second adjustable valve retainer 48 includes outlet ports 90 that, when exhaust valve member 56 of second end 52 is moved away from second valve seat 88, permit fluid to exit valve apparatus 10 through second exhaust 26 and fourth exhaust 31. Second adjustable valve retainer 48 also includes an exterior surface 92 that includes threaded surface 80 and also includes a recess 94 that is configured for receipt of a seal member 96 that engaged with bore 32 of pilot body 20.

Adjustable valve seat 47 is a generally cylindrically shaped member having an exterior surface 98 and an interior surface 100 for receipt of poppet 14. Exterior surface 98 includes a threading 101 that mates with a threaded surface 102 formed in bore 32 that enables the location of adjustable valve seat 47 to be adjustable within bore 32 in a manner similar to adjustable valve retainer 44. Exterior surface 98 is also configured for receipt of a seal member 104 that engages with bore 32. Interior surface 100 defines a third valve seat 106 that is configured to engage with valve member 54 of poppet 14 to permit or prevent fluid from inlet 22 from reaching first outlet 28 and first and third exhausts 30, 33.

Valve member 54 of poppet 14 controls whether fluid from inlet 22 is permitted to reach first outlet 28 or second outlet 24. To control whether fluid from inlet 22 reaches first outlet 28 or second outlet 24, bore 32 includes a radially inwardly extending fourth valve seat 108 (FIGS. 5 and 6) that is configured to engage with valve member 54. By moving poppet 14 and valve member 54 back and forth in bore 32 between third valve seat 106 of adjustable valve seat 47 and fourth valve seat 108 of bore 32, fluid from inlet 22 can be directed to either first outlet 28 or second outlet 24.

Again, referring to FIGS. 4 and 5, actuator assembly 16 that is configured to move poppet 14 and control fluid flow through valve apparatus 10 will now be described. As noted above, actuator assembly 16 includes solenoid assembly 18. Solenoid assembly 18 includes a housing 110 that may be formed of a material such a rigid polymeric material. Housing 110 includes a cavity 112 that houses a solenoid shell 114, which is a flux frame that may be formed of a material such as steel. Shell 114 supports a hollow solenoid coil 116 that is formed of a plurality of copper windings. An armature 118, shading coil 120, pole piece 122, and spool 124 are positioned in solenoid coil 116. A first bushing 126, a second bushing 128, and a third bushing 130 are positioned between solenoid coil 116 and armature 118 and pole piece 122.

Figure 4:
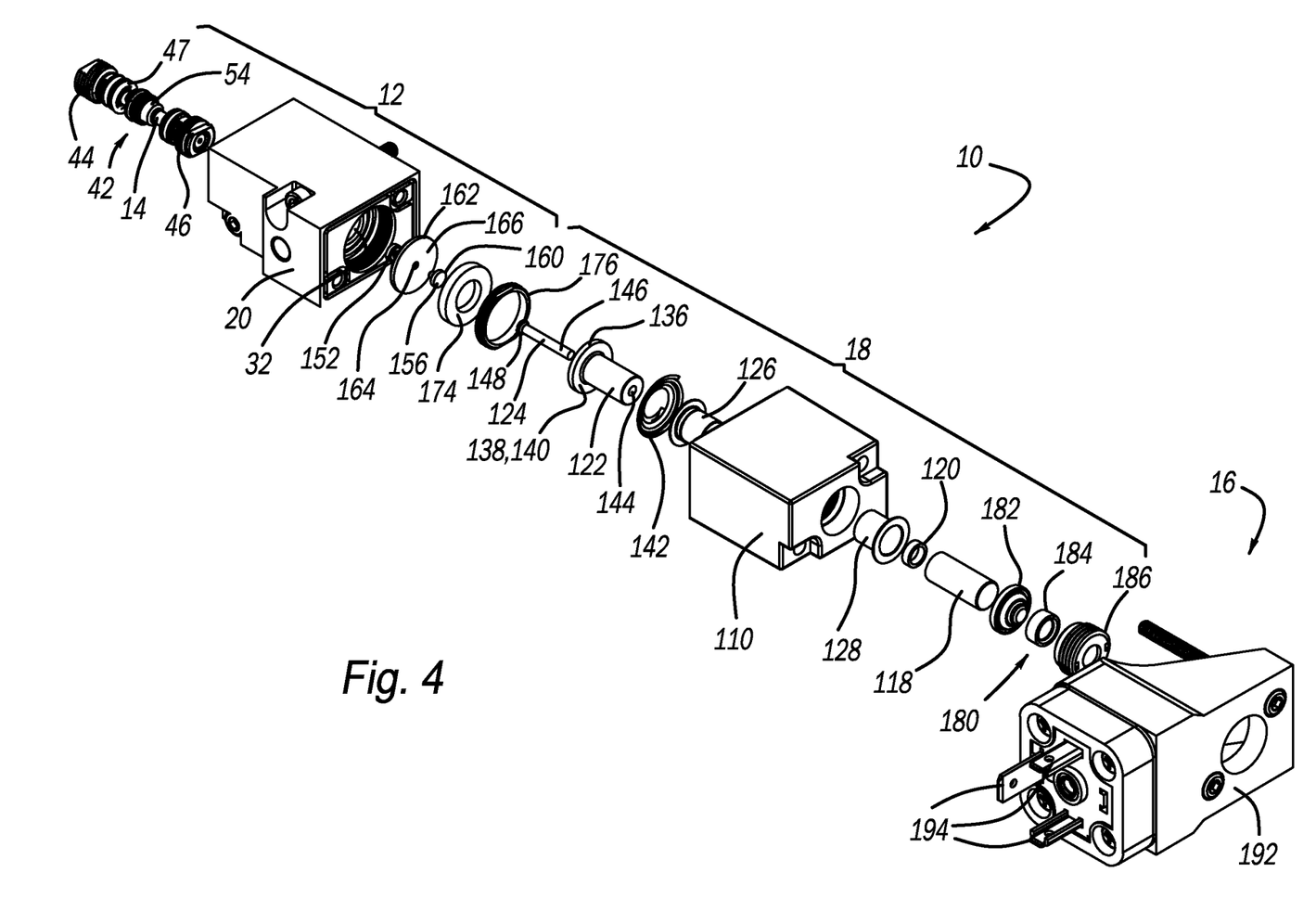
FIG. 4 is an exploded perspective view of the valve apparatus illustrated in FIGS. 1 to 3.

Armature 118 is a solid cylindrical member that is formed of a metal material that magnetically interacts with solenoid coil 116 when a voltage is applied to solenoid coil 116, which permits armature 118 to be movable relative to solenoid coil 116. Armature 118 includes an annular recess 132 that is configured for receipt of shading coil 120, which is a hollow cylindrical member.

Pole piece 122 is a hollow cylindrical member that is also formed of a metal material that magnetically interacts with solenoid coil 116 when a voltage is applied to solenoid coil 116, which permits pole piece 122 to be movable relative to solenoid coil 116. Pole piece 122 includes a proximate end 134 that faces armature 118 and a distal end 136 that faces poppet 14. Distal end 136 includes a radially outwardly extending flange 138 that is configured as a spring seat 140 for a biasing spring 142 located between flange 138 and shell 114. Pole piece 122 includes an axially extending through-hole 144 that radially expands at distal end 136 and is configured for receipt of spool 124. Spool 124 includes a shank 146 located within through-hole 144 and a head 148 that is positioned proximate the location at which through-hole 144 radially expands.

An insert 150 is located between spool 124 and poppet 14. Insert 150 includes a disc 152 having a central aperture 154, and a rivet 156 including a leg 158 that is mated with central aperture 154. Rivet 156 also includes an annular plate 160 attached to leg 158 that is configured to contact head 148 of spool 124. Insert 150 may be formed of a polymeric material or a metal material, without limitation. An annular diaphragm 162 is positioned between annular plate 160 and disc 152.

Annular diaphragm 162 includes a central opening 164 (FIG. 4) that is configured for receipt of leg 158 such that diaphragm 162 is sandwiched between disc 152 and annular plate 160. Diaphragm 162 is an annular member having a first surface 166 that faces spool 124 and a second surface 168 that faces poppet 14. An annular nub 170 is formed on second surface 168 at a radially outermost portion thereof that is configured to be seated within an annular groove 172 formed in pilot body 20. Diaphragm 162 may be formed, for example, a metal or polymeric material, and is configured to act as a seal between valve assembly 12 and solenoid assembly 18.

In this regard, valve apparatus 10 is generally used to provide a gaseous fluid such as air to a device (not illustrated) in need thereof. While the fluid that passes through valve apparatus 10 may be gaseous, it should be understood that condensation may develop within valve assembly 12. To ensure proper operation of solenoid assembly 18, it is necessary to prevent the condensation from reaching solenoid assembly 18. Thus, diaphragm 162 is configured to seal the interface between valve assembly 12 and solenoid assembly 18 and prevent or at least substantially minimize any condensation that forms within valve assembly 12 from reaching solenoid assembly 18.

A spacer ring 174 may be sandwiched between first surface 166 of diaphragm 162 and flange 138 of pole piece 122. In addition, to ensure that that spacer ring 174 provides sufficient pressure against diaphragm 162 such that annular nub 170 remains seated in annular groove 172, a threaded retainer ring 176 may threadingly engage with a threaded surface 178 of first open end 34 of bore 32 until threaded retainer ring 176 engages with spacer ring 174.

Solenoid assembly 18 also includes a packing 180 that seals the cavity 112 of housing 110. Packing 180 includes a polymeric operator seal 182 that faces armature 118, an annular manual operator 184, and a manual operator housing 186, wherein the annular manual operator 184 is located between operator seal 182 and operator housing 186. Operator housing 186 may include a threaded exterior surface 188 that mates with a threaded surface 190 of cavity 112. Packing 180 prevents moisture, dust, and debris from entering solenoid assembly 18.

To provide a voltage to solenoid assembly 18, valve apparatus 10 includes an electrical connector assembly 192 that is attached to solenoid assembly 18. Connector assembly 192 includes prongs 194 that are configured to mate with a power source (not shown) that provides a voltage via prongs 194 to solenoid coil 116. While not illustrated, it should be understood that connector assembly 192 may additionally include a controller that can control the amount of voltage that is applied to solenoid coil 116 to strictly control the magnetic interaction between solenoid coil 116, armature 118, and pole piece 122, which in turn strictly controls the amount of movement of poppet 14 to control the amount of fluid that can pass through valve apparatus 10.

Now operation of valve apparatus 10 will be described. As noted above, valve apparatus 10 includes a biasing spring 142 that biases pole piece 122 in a direction toward poppet 14. The force exerted by biasing spring 142, however, is not sufficient to force valve member 54 into engagement with third valve seat 106 when no voltage is being applied to solenoid assembly 18. Rather, when no voltage is being applied to solenoid assembly 18, the force exerted by spring 68 forces valve member 54 of poppet 14 into engagement with fourth valve seat 108 such that fluid can flow from inlet 22 to first outlet 28 and first and third exhausts 30, 33.

When a voltage is applied to solenoid assembly 18, armature 118 is attracted toward pole piece 122, which in in turn pushes spool 124 toward poppet 14 to move poppet 14 and valve member 54 in a direction toward third valve seat 106 of adjustable valve seat 47 and away from fourth valve seat 108 of bore 32. In this regard, it should be noted that the spring force exerted by biasing spring 142 in combination with the force generated by energizing solenoid assembly 18 is greater than that provided by spring 68, which permits valve member 54 to be biased toward third valve seat 106. Inasmuch as valve member 54 is biased toward third valve seat 106 and away from fourth valve seat 108, fluid is then permitted to travel from inlet 22 to second outlet 24 and second and fourth exhausts 26 and 31.

It should be noted that the amount of fluid that is permitted to flow past valve member 54 toward either first outlet 28 or second outlet 24 is controlled by the locations of first adjustable valve retainer 44, second adjustable valve retainer 48, and adjustable valve seat 47. By moving first adjustable valve retainer 44, second adjustable valve retainer 48, and adjustable valve seat 47, the distance at which valve member 54 is permitted to move between third valve seat 106 and fourth valve seat 108 can be strictly controlled, which in turn controls the amount of fluid that is permitted to flow past valve member 54. If more fluid is desired to pass from inlet 22 to first outlet 28, adjustable valve seat 47 can be located closer to second open end 36. If equal amounts of fluid are desired to pass through first and second outlets 28 and 24 (at different times), adjustable valve seat 47 can be located at a position that permits this function. In any of these cases, the location of first adjustable valve retainer 44 and second adjustable valve retainer 48 are selected based on the location of adjustable valve seat 47.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A valve apparatus, comprising:
   a valve assembly (12) including a valve body (20) defining an axially extending bore (32) having an inlet (22) and at least one outlet (28) in communication therewith, a valve seat (108) positioned within the axially extending bore (32), and a poppet (14) extending through the axially extending bore (32) and having a valve member (54) configured to contact the valve seat (108) to control a flow of fluid from the inlet (22) to the at least one outlet (28);
   a solenoid assembly (18) attached to the valve assembly (12) that is configured to move the valve member (54) towards and away from the valve seat (108), the solenoid assembly including a shell (114), a solenoid coil (116) attached to the shell (114) that magnetically interacts with a movable hollow pole piece (122) that includes a radially outwardly extending flange (138) that is configured as a spring seat (140) for a biasing spring (142) located between the flange (138) and the shell (114) that biases the movable hollow pole piece (122) in a direction toward the poppet (14), a spool (124) located within the hollow pole piece (122), and an insert (150) located between the spool (124) and the poppet (14); and
   a diaphragm (162) positioned in the axially extending bore (32) between the valve assembly (12) and the solenoid assembly (18), the diaphragm (162) being configured to seal the valve assembly (12) from the solenoid assembly (18) and having a central opening (164),
   wherein the insert (150) includes a disc (152) positioned between the poppet (14) and the diaphragm (162) and a rivet (156) positioned between the diaphragm (162) and the spool (124),
   the rivet (156) includes an annular plate (160) in contact with the spool (124) and a leg (158) extending outward from the annular plate (160) and through the central opening (164) of the diaphragm (162),
   the disc (152) includes a central aperture (154) configured for receipt of the leg (158) of the rivet (156), and
   the diaphragm (162) is sandwiched directly between the annular plate (160) of the river (156) and the disc (152).

2. The valve apparatus according to claim 1, wherein the diaphragm (162) is an annular member including an annular nub (170) extending about a perimeter of the annular member, the annular nub (170) being configured to mate with an annular groove (172) formed in the valve body (20).

3. The valve apparatus according to claim 1, wherein the at least one outlet (28) is positioned on a first side of the valve member (54) and another outlet (24) is located on a second and opposite side of the valve member (54), and when solenoid assembly (18) moves the valve member (54) away from the valve seat (108), the fluid is permitted to flow to the another outlet (24).

4. The valve apparatus according to claim 3, wherein the valve seat (108) extends radially inwardly from the axially extending bore (32), and an adjustable valve seat (106) positioned in the axially extending bore (32) is configured to be contacted by the valve member (54) when the valve member (54) is moved by the solenoid assembly (18) away from the valve seat (108) to thereby prevent the fluid from flowing from the inlet (22) to the at least one outlet (28), and permit the fluid to flow from the inlet (22) to the another outlet (24).

5. The valve apparatus according to claim 1, wherein the valve assembly (12) includes a spring (68) that biases the valve member (54) of the poppet (14) into engagement with the valve seat (108).

6. A valve apparatus, comprising:
   a valve body (20) defining an inlet (22), a first outlet (28), and a second outlet (24) that each communicate with an axially extending bore (32);
   a valve assembly (12) including a poppet (14) having a valve member (54) located within the axially extending bore (32), the poppet (14) being movable relative to a valve seat (108) and an adjustable valve seat (106) that are each configured to be contacted by the valve member (54), wherein contact between the valve member (54) and the valve seat (108) permits a fluid to flow from the inlet (22) to the first outlet (28);
   a solenoid assembly (18) attached to the valve body (20), the solenoid assembly (18) including a shell (114), a solenoid coil (116) attached to the shell (114), and a hollow movable pole piece (122) that is connected to the poppet (14) and at least partially extends into the axially extending bore (32), the solenoid coil (116) and the pole piece (122) configured to cooperatively move the valve member (54) away from the valve seat (108) toward the adjustable valve seat (106) to permit the fluid to flow from the inlet (22) to the second outlet (24), and the hollow movable pole piece (122) including a radially outwardly extending flange (138) that is configured as a spring seat (140) for a biasing spring (142) locat tween the flange (138) and the shell (114) that biases the hollow movable pole pol piece (122) in a direction toward the adjustable valve seat (106); and
   a diaphragm (162) positioned in the axially extending bore (32) between the hollow movable pole piece (122) and the poppet (14), the diaphragm (162) having a central opening (164) and being configured to seal the valve body (20) from the solenoid assembly (18),
   wherein a spool (124) is located within the hollow movable pole piece (122), and an insert (150) is located between the spool (124) and the poppet (14);

the insert (150) includes a disc (152) positioned between the poppet (14) and the diaphragm (162) and a rivet (156) positioned between the diaphragm (162) and the spool (124), the rivet (156) includes an annular plate (160) in contact with the spool (124) and a leg (158) extending outward from the annular plate (160) and through the central opening (164) of the diaphragm (162), the disc (152) includes a central aperture (154) configured for receipt of the leg (158) of the rivet (156) such that the disc (152) and the annular plate (16) sandwich the diaphragm (162) therebetween, and the diaphragm (162) is sandwiched directly between the annular plate (160) of the rivet (156) and the disc (152).

7. The valve apparatus according to claim 6, wherein the valve seat (108) extends radially inwardly from the axially extending bore (32).

8. The valve apparatus according to claim 6, wherein the diaphragm (162) is an annular member including an annular nub (170) extending about a perimeter of the annular member, the annular nub (170) being configured to mate with an annular groove (172) formed in the valve body (20).

9. The valve apparatus according to claim 6, wherein the biasing spring (142) is a first spring that biases the pole piece (122) in a direction toward the poppet (14) to bias the valve member (54) of the poppet (14) into engagement with the adjustable valve seat (106) upon application of a voltage to the solenoid assembly (18).

10. The valve apparatus according to claim 9, wherein the poppet (14) is positioned within a valve retainer (42), and the valve retainer (42) includes a second spring (65) that biases the poppet (14) in a direction toward the pole piece (122).

11. A valve apparatus, comprising:

a valve assembly (12) including a valve body (20) that defines an inlet (22), a first outlet (28), and a second outlet (24), and including a poppet (14) located in the valve body (20) that includes a valve member (54);

an actuator assembly (16) attached to the valve assembly (12), the actuator assembly (16) including a solenoid assembly including a hollow shell (114), a solenoid coil (116) attached to the hollow shell (114), an armature (118) provided in the hollow shell (114), and a hollow pole piece (122) that is provided in the hollow shell (114) is and_coupled to the poppet (14), the armature (118) and hollow pole piece (122) beingand is configured to move the poppet (14) and the valve member (54) to control a flow of fluid through the valve assembly (12) from the inlet (22) to either the first outlet (28) or the second outlet (24);

the hollow pole piece (122) being movable and including a radially outwardly extending flange (138) that is configured as a spring seat (140) for a biasing spring (142) located. betw de flange (138) and the shell (114) that biases ole piece (122) in a direction toward oppet (14); and a diaphragm (162) located between valve assembly (12) and the actuator assembly (16), the diaphragm (162) having a central opening (164) and being configured to seal the valve assembly (12) from the actuator assembly (16), wherein a spool (124) is located within the hollow pole piece (122), and an insert (150) is located between the spool (124) and the poppet (14);

the insert (150) includes a disc (152) positioned between the poppet (14) and the diaphragm (162) and a rivet (156) positioned between the diaphragm (162) and the spool (124), the rivet (156) includes an annular plate (160) in contact with the spool (124) and a leg (158) extending outward from the annular plate (160) and through the central opening (164) of the diaphragm (162), and the disc (152) includes a central aperture (154) configured for receipt of the leg (158) of the rivet (156) such that the disc (152) and the annular plate (16) sandwich the diaphragm (162) directly therebetween.

12. The valve apparatus according to claim 11, wherein the diaphragm (162) is an annular member including an annular nub (170) extending about a perimeter of the annular member, the annular nub (170) being configured to mate with an annular groove (172) formed in the valve body (20).

13. The valve apparatus according to claim 11, wherein the armature (118) and hollow pole piece (122) cooperate to move the poppet (14) and the valve member (54) upon application of a voltage to the solenoid assembly (18).

14. The valve apparatus according to claim 11, wherein the poppet (14) is positioned in an axially extending bore defining a first valve seat (108) that is configured to be engaged by the valve member (54).

15. The valve apparatus according to claim 14, wherein the biasing spring (142) is a first spring (142) that biases the pole piece (122) in a direction toward the poppet (14) to bias the valve member (54) of the poppet (14) into engagement with a second valve seat (106) upon application of the voltage to the solenoid assembly.

16. The valve apparatus according to claim 15, wherein when no voltage is applied to the solenoid assembly (18) the valve member (54) is engaged with the first valve seat (108).

17. The valve apparatus according to claim 16, wherein the poppet (14) is positioned in an adjustable valve retainer (44) having a second spring (68) that biases the poppet (14) in a direction toward the actuator assembly (16).

18. The valve apparatus according to claim 17, wherein a spring constant of the first spring (142) is less than a spring constant of the second spring (68).

19. The valve apparatus according to claim 11, wherein the valve body (20) includes a first exhaust downstream (30) from the first outlet (28), and a second exhaust (26) located downstream from the second outlet (24).

* * * * *